US011557834B2

(12) United States Patent
Badichi et al.

(10) Patent No.: US 11,557,834 B2
(45) Date of Patent: Jan. 17, 2023

(54) FLEXIBLE ARRAY ANTENNA AND METHODS OF OPERATING SAME

(71) Applicant: Elta Systems Ltd., Ashdod (IL)

(72) Inventors: Harel Badichi, Modi'in (IL); Zvi Lifshiz, Nitzan (IL); Feri Tayouri, Ashdod (IL); Sharon Cohen, Gedera (IL); Amir Shmuel, Ashdod (IL)

(73) Assignee: Elta Systems Ltd., Ashdod (IL)

( * ) Notice: Subject to any disclaimer, the term of this patent is extended or adjusted under 35 U.S.C. 154(b) by 380 days.

(21) Appl. No.: 16/676,700

(22) Filed: Nov. 7, 2019

(65) Prior Publication Data

US 2022/0285836 A1 Sep. 8, 2022

(30) Foreign Application Priority Data

Nov. 21, 2018 (IL) .......................... 263189

(51) Int. Cl.
*G08G 5/00* (2006.01)
*H01Q 3/02* (2006.01)
(Continued)

(52) U.S. Cl.
CPC ............. *H01Q 3/02* (2013.01); *B64C 39/024* (2013.01); *B64D 47/00* (2013.01); *G01S 13/08* (2013.01); *G01S 13/867* (2013.01); *G01S 19/01* (2013.01); *G05D 1/104* (2013.01); *G06T 7/70* (2017.01); *G08G 5/0008* (2013.01); *G08G 5/0043* (2013.01); *G08G 5/0052* (2013.01); *G08G 5/0069* (2013.01); *G08G 5/0078* (2013.01); *H01Q 3/22* (2013.01); *H04B 7/18504* (2013.01); *B64C 2201/027* (2013.01);
(Continued)

(58) Field of Classification Search
CPC ........ H01Q 3/02; G05D 1/104; G08G 5/0052; G08G 5/0069; H04B 7/18504
See application file for complete search history.

(56) References Cited

U.S. PATENT DOCUMENTS 4,843,397 A  6/1989 Galati et al.
9,415,869 B1  8/2016 Chan et al.
(Continued)

FOREIGN PATENT DOCUMENTS

RU  2656285 C1  6/2018

OTHER PUBLICATIONS

Garza, et al., "Design of UAVs-Based 3D Antenna Arrays for a Maximum Performance in Terms of Directivity and SLL", International Journal of Antennas and Propagation, vol. 2016, Article ID 2621862, 2016, pp. 1-8.
(Continued)

*Primary Examiner* — Andrew W Bee
(74) *Attorney, Agent, or Firm* — Dorsey & Whitney LLP

(57) ABSTRACT

An array antenna configured to be placed at a determined position above the ground surface. The array antenna is assembled by a plurality of unmanned aerial vehicles (UAVs), each UAV carrying one or more antenna elements of the array antenna. The plurality of UAVs configured to create a defined formation at the determined position above the ground and thereby align the one or more antenna elements carried by the UAVs to form the array antenna. The array antenna configured to receive electromagnetic signals reflected from a region of interest, or from one or more objects, within its line of sight.

32 Claims, 4 Drawing Sheets

(51) Int. Cl.
*G06T 7/70* (2017.01)
*B64C 39/02* (2006.01)
*B64D 47/00* (2006.01)
*G01S 13/08* (2006.01)
*G01S 13/86* (2006.01)
*G01S 19/01* (2010.01)
*G05D 1/10* (2006.01)
*H01Q 3/22* (2006.01)
*H04B 7/185* (2006.01)

(52) U.S. Cl.
CPC .. *B64C 2201/042* (2013.01); *B64C 2201/122* (2013.01); *B64C 2201/123* (2013.01); *B64C 2201/143* (2013.01); *G06T 2207/10032* (2013.01)

(56) References Cited

U.S. PATENT DOCUMENTS

| | | | |
|---|---|---|---|
| 9,836,049 | B1 | 12/2017 | Tu |
| 2008/0186235 | A1* | 8/2008 | Struckman ................ G01S 5/12 342/465 |
| 2013/0070677 | A1 | 3/2013 | Chang |
| 2015/0276917 | A1 | 10/2015 | Dawber et al. |
| 2016/0046387 | A1 | 2/2016 | Frolov et al. |

OTHER PUBLICATIONS

European Search Report dated May 27, 2022 received in EP19210735.7.

* cited by examiner

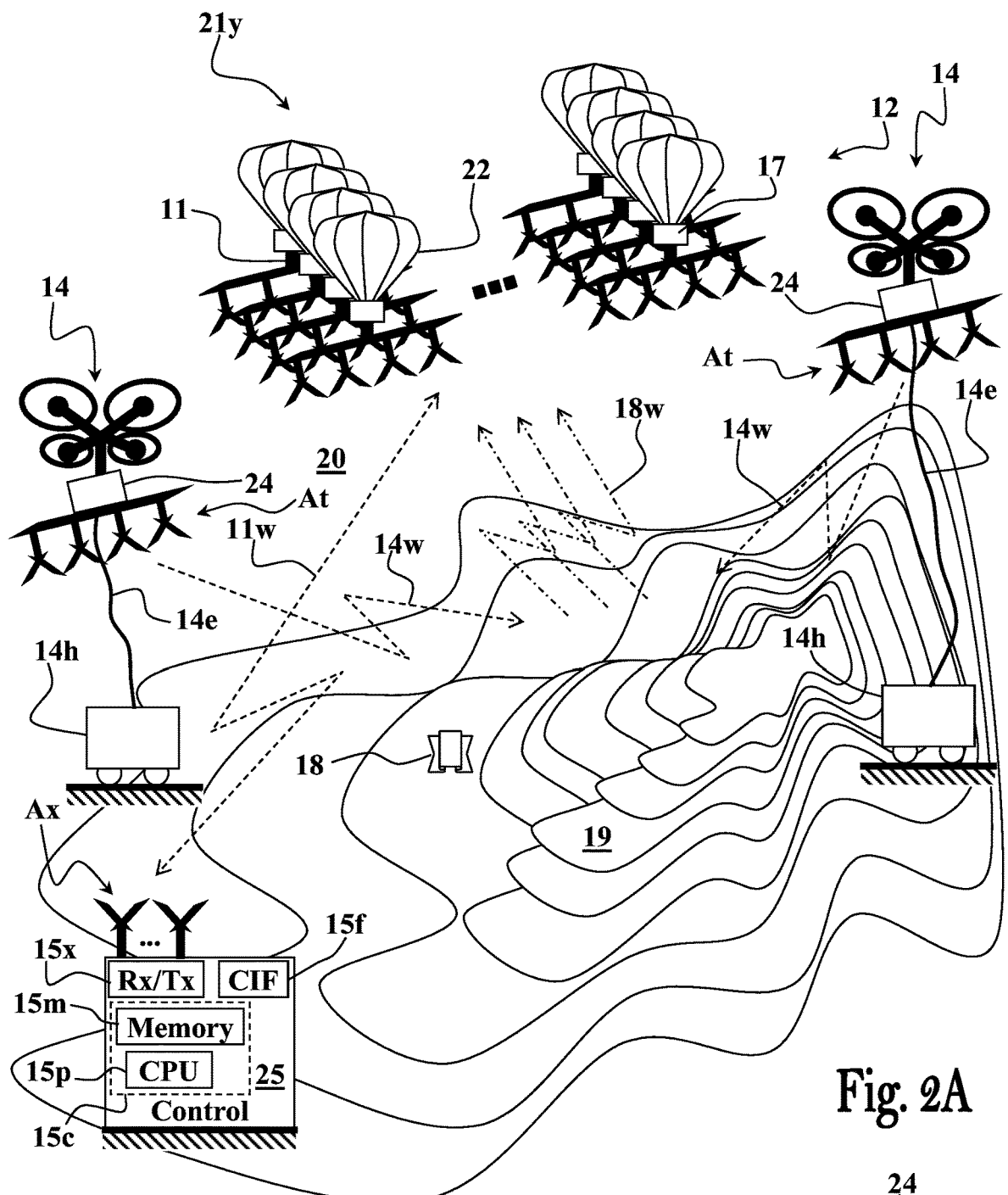
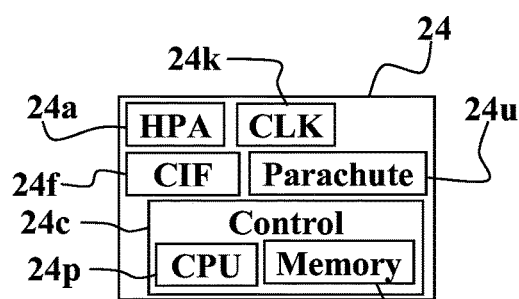
Fig. 2A
Fig. 2B

FLEXIBLE ARRAY ANTENNA AND METHODS OF OPERATING SAME

TECHNOLOGICAL FIELD

The present invention is generally in the field of array antennas, and particularly relates to a maneuverable array antenna.

BACKGROUND

Antenna systems are typically placed at elevated terrain positions or in open areas, in order for them to have a clear line-of-sight (LOS). It however turns out that such antenna system configurations have a limited line-of-sight, and may be unable establish LOS to areas blocked by terrain elevations.

A possible solution to the limited LOS of such antenna systems is placing the antenna on an air-vehicle (e.g., air craft, zeppelin, or suchlike). However, these solutions are limited to relatively small antenna sizes/apertures, and substantially vulnerable, particularly when large antennas sizes/apertures are required. An air-craft carrying an antenna system of a substantially great size/aperture, may be required to maintain the antenna system substantially stationary during some time periods, which thus can be easily identified and neutralized.

U.S. Pat. No. 9,415,869 suggests a plurality of UAVs may be operated in a fleet, each of the UAVs in the fleet being configured to work collectively to achieve one or more functions, such as to create a display or implement an antenna array. The fleet of UAVs may operate individually and/or may be coupled to one another to operate as a collective unit. In some embodiments, one or more UAVs in the fleet may operate individually, while two or more UAVs in the fleet may be connected to one another. In such embodiments, the individual UAVs and the connected UAVs may together comprise the fleet.

Russian Patent No. 2656285 suggests that in some space, autonomous power supply units, transmit-receive units and phased array elements are placed, separate blocks and elements are connected with a central station of communication channels where operational signals and control signals are transmitted, and operational signals and control signals are transmitted different communication channels. At the same time, a swarm of unmanned aerial vehicles (UAVs) is formed. One autonomous power supply unit and one transceiver unit are placed on one UAV, on which the phased array element is fixed. Units and elements on the UAV are connected to the central station and to each other by communication channels, which control the UAV swarm. UAVs are placed and oriented in space so as to provide a preset radiation pattern. In this case, radio communication channels are used to control the UAV and phased array, and for transmission of operational signals is used either radio communication channels, or communication channels on separate cables, by which in this case the phased array elements on each UAV are connected to the central station.

General Description

In a broad aspect, the present application provides a flexible array antenna system, that is maneuverable and scalable/adaptive, having high survivability, and which is assembled above the ground surface by a plurality of unmanned aerial vehicles (UAVs). The UAVs are configured to construct a defined off-the-ground formation at a desired location in space, and thereby deploy an antenna array by one on more antenna elements carried by each of the UAVs. Accordingly, the antenna array is assembled by arranging the UAVs in the defined off-the-ground formation/array and maintaining the formation/array of UAVs in the air with fixed distances between the UAVs, thereby aligning the antenna elements carried by the UAVs to form a corresponding array of the antenna elements thereby carried.

The UAVs can be implemented by any suitable type of wirelessly controlled, or semi-controlled, flying object, capable of carrying an antenna element, taking off from a defined location, reaching a defined location in space and remaining therein to construct a formation/array with the other UAVs. The UAVs can be configured to perform relative navigation to accurately maintain their fixed position in the formation/array of UAVs. Thus, in some embodiments, the UAVs are implemented by drones, and/or types of hybrid drones (i.e., having electrical and combustion engines), and/or certain types of flying balloons, such as drone balloons for example, and/or certain types of drone helicopters, and/or any suitable flying object capable of substantially maintain a fixed position in a formation/array based on location data provided by main control of the system.

The formation/array of UAVs can be controlled by a ground control station configured to communicate data and instructions with at least one, or more, of the UAVs. The control station can receive and process signals/data received by the antenna elements of the UAVs, instruct the UAVs to move the formation/array to a new position i.e., locate the array antenna in a new position, instruct the UAVs to change orientation of the formation/array of UAVs i.e., change the broadside of the antenna area, instruct the UAVs to increase or decrease the distance maintained between neighboring UAVs in the formation/array i.e., increase or decrease the aperture of the array antenna, and/or instruct the UAVs to construct a different formation/array i.e., to change the shape of the array antenna. For example, and without being limiting, the control station may instruct the UAVs to change from a one-dimensional/linear array formation into a two-dimensional array formation.

The UAVs can be powered by chargeable, and/or disposable, batteries, and/or utilize a type of combustion engine powered by a suitable energy-condensed fuel (e.g., gasoline, diesel, combustible gasses, and/or suchlike), and/or by solar energy sources thereby carried (e.g., using solar panels).

The off-the-ground assembled array antenna can be used to transmit electromagnetic signals towards a region-of-interest (ROI) and/or receive electromagnetic signals returning from a ROI, and/or from one or more objects within the ROI. Thus, in some embodiments, the off-the-ground UAVs formation/array should be maintained substantially stationary in the air during signal receive time periods. In order to maintain the UAVs in a substantially fixed location relative to the other UAVs in the formation/array, in some embodiments each UAV utilizes one or more, and in some embodiments two or more, imagers/cameras e.g., digital cameras used for relative position navigation. Additionally, or alternatively, the formation/array of UAVs constructing the array antenna is formed and maintained using local positioning system (LPS) techniques e.g., LORAN, DECCA, or suchlike.

The imagers/cameras can be used for determining the distance of the UAV from at least one other UAV in the formation/array, and for accordingly generating flight control data to maintain the UAV at fixed distances from the at least one other UAV in the formation/array. A control unit of each UAV can be configured to process imagery data obtained from two or more imagers/cameras of the UAV, determine based thereon its distance from neighboring UAVs in the formation/array, and determine the respective flight control data for maintaining the UAV at fixed and substantially unchanged distances from the neighboring UAVs in the formation/array. In this way the antenna elements carried by the UAVs constructing the formation can be aligned to form the off-the-ground array antenna. Thus, in some embodiments, at least some of the UAVs can be autonomous UAVs, or partially autonomous UAVs, configured to maintain a substantially fixed position relative to other UAVs in the formation/array.

In some embodiments the array antenna obtained by the formation of UAVs is used as a receiving antenna (also referred to herein as Rx-antenna) configured to receive return signals from a region-of-interest (ROI), and/or from one or more objects, within its line-of-sight. Optionally, the array antenna constructed by the formation/array of UAVs is used as both a receiving antenna and a transmitting antenna (also referred to herein as Tx-antenna). Each UAV can carry several antenna elements fixedly, or adjustably, arranged in proper distances required to construct the antenna array with the other antenna elements of the other UAVs, as they become aligned by the UAVs formation/array. Optionally, but in some embodiments preferably, each UAV carries an array of antenna elements configured to align with array of antenna elements of at least one other UAV in the formation/array, to thereby construct the off-the-ground array antenna. The antenna elements mounted in each UAV can be a type of hemispherical, omni-directional, or sector, antennas.

Accordingly, each UAV can have respective several receiver units/circuitries, each for receiving return signals from a respective one of the antenna elements thereby carried. Optionally, but in some embodiments preferably, each UAV also have respective several analog-to-digital (A/D) converters, for converting the return analog signals received by each antenna element of the UAV into respective digital signals.

One or more transmitting antennas can be used to generate electromagnetic signals and transmit them towards the ROI/objects. The signals transmitted by the one or more transmitting antennas are reflected off the ROI/objects, and received as return signals by the array antenna assembled by the UAV formation/array.

Optionally, but in some embodiments preferably, the one or more transmitting antennas are not part of the antenna array constructed by the formation/array of UAVs. The one or more transmitting antennas, and their respective transmitters, can be mounted on one or more transmit towers/poles, but in some embodiments they are mounted in respective one or more transmitting UAVs (also referred to herein as Tx-UAVs), that can be located at some defined distances from the formation/array of UAVs that construct the Rx-antenna array. The antenna elements mounted in each Tx-UAV can be a type of hemispherical, omni-directional, or sector, antennas.

In some embodiments one or more transmitting antennas are mounted in one or more Tx-AUVs having an electric cable connecting them to a respective ground station. The electric cable connecting between one of the Tx-UAVs and its respective ground station can comprise data communication wires and/or electric power wires for actuating the engine(s) of the Tx-UAV. However, if the Tx-UAV is operated by a type of combustion engine, such electric power wires are not required and can be omitted, such that the electric cable may comprise only signals/data communication wires. Each ground station can be configured to control via the communication cable the position/altitude and/or orientation of its respective Tx-UAV, control the directionality of the signals transmitted by the respective transmitting antenna(s), and generate pulse signals to be transmitted by the respective transmitting antenna(s).

Accordingly, the Tx-UAVs in these embodiments are not part of the formation of UAVs used to form the receive antennas array. The ground station may be mounted in a type of land vehicle configured to carry the electric cable connected to the Tx-UAV. Optionally, one or more of the Tx-UAV are configured to also receive electromagnetic signals returning from the ROI, and/or from one or more objects within the ROI.

One inventive aspect disclosed herein relates to an array antenna configured to be placed at a determined position above the ground surface. The array antenna is assembled by a plurality of UAVs, where each of the UAVs carry one or more antenna elements of the array antenna. The plurality of UAVs can be configured to create a defined formation at the determined position above the ground, and thereby align the one or more antenna elements carried by the UAVs to form the array antenna. The array antenna can be configured to receive electromagnetic signals reflected from a region of interest, or from one or more objects, within its line of sight. Each UAV can comprise at least one receiver configured to receive the electromagnetic signals from the one or more antenna elements.

Each UAV comprises in some embodiments a control unit configured and operable to control movement of the UAV for accurately maintaining the UAV in position within the formation of UAVs above the ground surface. Optionally, but in some embodiments preferably, each UAV comprises at least one imager/camera configured to acquire imagery data of other UAVs in the formation. The control unit can be configured to process the imagery data from the at least one imager/camera, determine distance of the UAV from at least one of the other UAVs, and whenever needed, apply correcting movements to the UAV for maintaining the UAV in its accurate positon in the formation of UAVs. A distance between neighboring antenna elements in the array antenna is determined in some embodiments according to a frequency of the received electromagnetic signals.

Each UAV can utilize one or more analog-to-digital converters configured to convert the electromagnetic signals received by the one or more antenna elements of the UAV into corresponding digital signals. A data communication unit provided in each UAV can be used to communicate data with a control center. Data transmitted by each UAV to the control center can comprise data indicative of the electromagnetic signals received by the one or more antenna elements of the UAV. Each UAV can also comprise an accurate clock device for synchronizing between the electromagnetic signals received by the antenna elements of the different UAVs in the formation.

In some possible embodiments at least one of the UAVs comprises a GPS unit configured to generate location data indicative of a location of the UAV. The control unit can be configured to receive position data indicative a target location of the UAV in space, and control movement of the UAV for placing it at the target location based on the location data received from the GPS unit. The control unit can be configured to receive data indicative of a position in which the UAV needs to be in the formation, and if needed, apply correcting movements to the UAV based on the imagery data from the one or more imagers/cameras for accurately placing the UAV in its position in the formation.

The control unit can be configured to use local positioning systems to position and maintain the UAV in its location in the formation. Optionally, but in some embodiments preferably, at last one of the UAVs comprises combustion engine(s).

Another inventive aspect disclosed herein relates to radar system utilizing the array antenna described hereinabove or hereinbelow as a receiving antenna. The radar system comprises in some embodiments one or more transmitting antennas mounted on land and/or areal structures for transmitting electromagnetic signals towards one or more objects and/or a ROI within the line of sight of the array antenna. Alternatively, or additionally, the one more transmit antennas are mounted on respective one or more Tx-UAVs which are not part of the UAV formation creating the receive array antenna of the system. Each Tx-UAV can be connected by an electrical cable to a ground station, wherein the electric cable is configured to communicate signals/data and/or instructions between the Tx-UAV and the ground station. The Tx-UAV can be operated by electrical engine(s), and the electric cable can be configured to provide electrical power to said electrical engine(s). In some embodiment the Tx-UAV comprises combustion engine(s).

The radar system comprises in some embodiments a control center configured to transmit to the UAVs data indicative of a location at which at least one of the UAVs is to be positioned. The control center can be configured to transmit to the UAVs data indicative of at least one of the following: at least one required geometrical dimension of the array antenna; a required aperture of the array antenna; a required orientation of at least one of the UAVs; a required broadside of the array antenna; a required new position of the array antenna. The control units of the UAVs can be configured to adjust locations of one or more of the UAVs according to the data received from the control center.

Yet another inventive aspect disclosed herein relates to a method of constructing an array antenna. The method comprises launching a plurality of UAVs, each of the UAVs comprising at least one antenna element and receiver configured to receive electromagnetic signals reflected from a ROI and/or at least one object, and determining location and at least one geometrical dimension of the array antenna and transmitting to each UAV respective position data to arrange the UAVs in a formation to thereby construct the array antenna having the at least one geometrical dimension at the determined location. The can comprise transmitting to the UAVs data indicative of at least one of the following: a required aperture of the array antenna; a required orientation of at least one of the UAVs; a required broadside of the array antenna; a required new position of the array antenna, and controlling one or more of the UAVs to adjust their locations and/or orientations accordingly.

The method comprises in some embodiments using at least one of the UAVs to acquire imagery data of at least another one of the UAVs, processing the imagery data to determine a distance of the at least another one of the UAVs, and controlling one or more of the UAVs to adjust their locations based on the determined distance. A global positioning system can be used for determining location of at least one of the UAVs, and controlling one or more of the UAVs to adjust their locations based on the determined location. Alternatively, or additionally, a local positioning system can be used to determine location of at least one of the UAVs, and controlling one or more of the UAVs to adjust their locations based on the determined location.

The method comprises in some embodiments transmitting by each UAV data indicative of the electromagnetic signals received by it's at least one antenna element to a control center. Optionally, but in some embodiments preferably, the method comprises accurately determining a time of arrival of the electromagnetic signals received in the at least one antenna element of each one of the plurality of UAVs.

In some embodiments the method comprises identifying at least one malfunctioning or energy depleted UAV in the plurality of UAVs, and launching respective at least one new UAV towards the UAVs formation for replacing the at least one malfunctioning or energy depleted UAV. The method can comprise removing the at least one malfunctioning or energy depleted UAV from the UAVs formation, and controlling one or more of the UAVs to adjust their locations to construct a new formation of the remaining UAVs, to thereby construct a new array antenna structure. The method can further comprise introducing the respective at least one new UAV into the new formation to thereby restore an original formation of the UAVs, or construct a new modified new array antenna structure that is different from the original formation and from the new formation.

The method may comprise controlling one or more of the UAVs to adjust their locations to thereby adjust at least one geometrical dimension of the array antenna to comply with a frequency of the electromagnetic signals reflected from the ROI and/or object.

The method optionally comprising transmitting by one or more transmitters and respective antenna elements electromagnetic signal towards the ROI and/or at least one object. Each of the one or more transmitters and respective antenna elements can be mounted on a Tx-UAV. The method can thus comprise launching the one or more Tx-UAVs, transmitting to each of the one or more Tx-UAVs data indicative of a required position of said Tx-UAV and direction of transmittal thereof, and controlling one or more of the Tx-UAVs to adjust their locations and/or orientations accordingly. Optionally, the method comprises transmitting to at least one of the Tx-UAVs data indicative of at least one of a required orientation of the at least one Tx-UAV and a required position of the at least one Tx-UAV, and controlling the at least one Tx-UAV to adjust its location and/or orientation accordingly.

A yet further inventive aspect disclosed herein relates to a control system of an array antenna. The control center comprising a control unit, and one or more transceivers and antennas configured to communicate data with at a plurality of UAVs. Each of the plurality of UAVs can comprise at least one antenna element and receiver configured to receive electromagnetic signals reflected from a ROI and/or one or more objects, and at least one transceiver and antenna element configured to communicate the data with the control unit. The control unit is configured to receive from each of the plurality of UAVs data indicative of electromagnetic signals received by its at least one antenna element, and to transmit to the plurality of UAVs position data for constructing a formation and thereby form an array antenna structure by the at least one antenna element of each of said plurality of UAVs. The control unit can be configured to transmit to the plurality of UAVs data indicative of at least one of the following: at least one required geometrical dimension of the array antenna; a required aperture of the array antenna; a required orientation of at least one of the UAVs; a required broadside of the array antenna; a required new position of the array antenna, and control motion of said UAVs to adjust locations one or more of the UAVs accordingly.

The control unit is configured in some embodiments to communicate data with at least one Tx-UAV. Each Tx-UAV can have one or more transmitters and antenna elements for transmitting the electromagnetic signals towards the ROI and/or the one or more objects, and at least one receiver and antenna for receiving data from the control center. The control center can be configured to transmit to the at least one Tx-UAV data indicative of at least one of a required orientation of the at least one Tx-UAV and a required position of the at least one Tx-UAV.

BRIEF DESCRIPTION OF THE DRAWINGS

In order to understand the invention and to see how it may be carried out in practice, embodiments will now be described, by way of non-limiting example only, with reference to the accompanying drawings. Features shown in the drawings are meant to be illustrative of only some embodiments of the invention, unless otherwise implicitly indicated. In the drawings like reference numerals are used to indicate corresponding parts, and in which:

FIG. 1B is a block diagram showing components of a Rx-UAV;

FIG. 2A and FIG. 2B schematically illustrate an antenna system according to some possible embodiments using transmit antenna(s) mounted on Tx-UAV(s), wherein FIG. 2A schematically illustrates an off-the-ground two-dimensional array antenna assembled by a two-dimensional formation/array of UAVs and the transmit antenna(s) carried by the Tx-UAV(s), and FIG. 2B is a block diagram showing components of a Tx-UAV;

DETAILED DESCRIPTION OF EMBODIMENTS

Figures 1A, 1B:
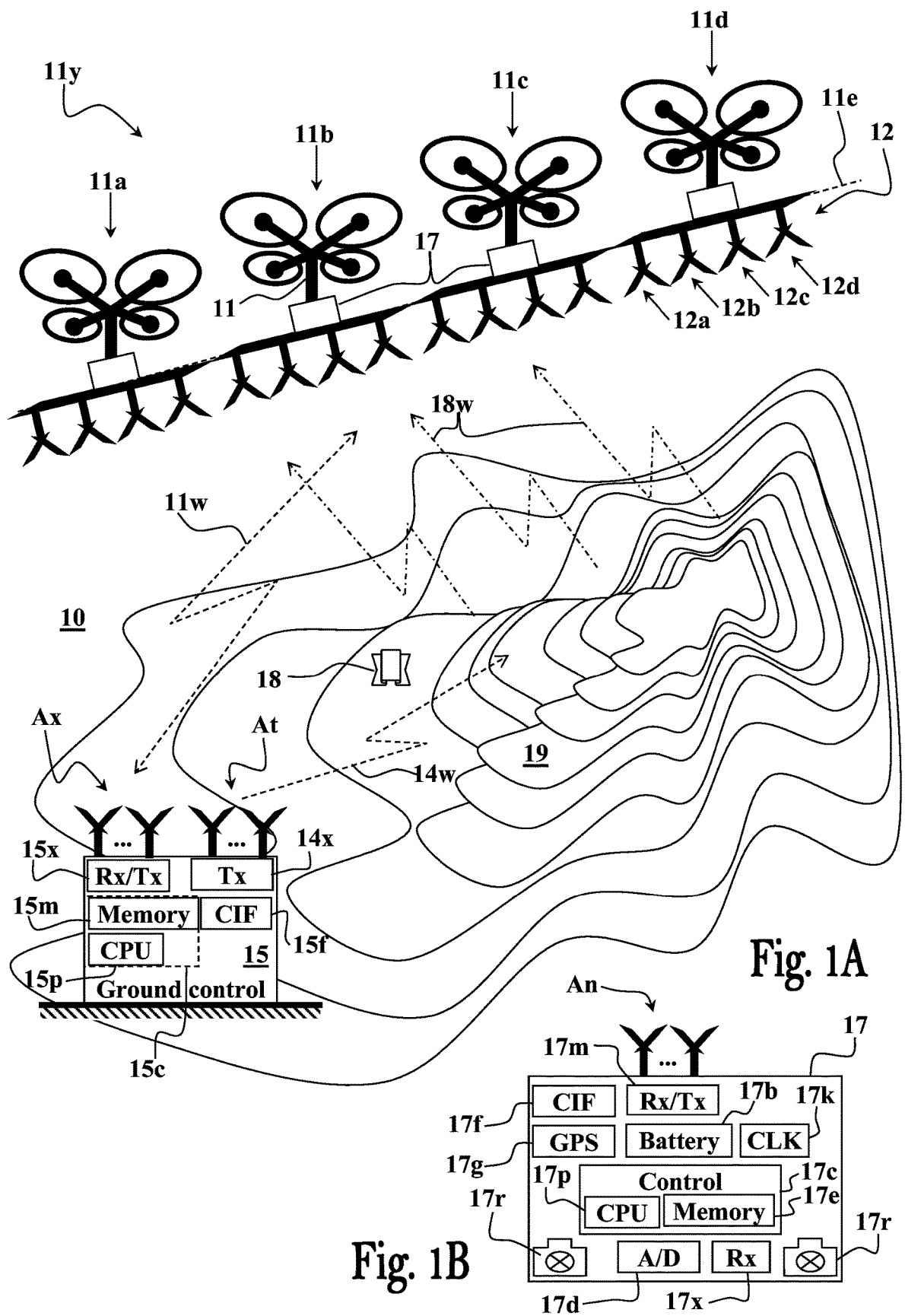
FIGS. 1A and 1B schematically illustrate an antenna system according to some possible embodiments using an off-the-ground receiving array antenna and a ground transmitting antenna(s), wherein FIG. 1A schematically illustrates an off-the-ground array antenna assembled by a formation/array of UAVs, and a ground control configured to operate the system.

One or more specific embodiments of the present disclosure will be described below with reference to the drawings, which are to be considered in all aspects as illustrative only and not restrictive in any manner. In an effort to provide a concise description of these embodiments, not all features of an actual implementation are described in the specification. Elements illustrated in the drawings are not necessarily to scale, or in correct proportional relationships, which are not critical. Emphasis instead being placed upon clearly illustrating the principles of the invention such that persons skilled in the art will be able to make and use the off-the-ground array antenna, once they understand the principles of the subject matter disclosed herein. This invention may be provided in other specific forms and embodiments without departing from the essential characteristics described herein.

The present application provides an off-the-ground (i.e., positioned above the ground surface) array antenna assembled by a plurality of UAVs, each carrying one or more antenna elements, and/or an array of antenna elements. The UAVs are configured to take off and create a formation/array at a defined altitude above the ground surface, and to thereby align the antenna element(s) carried by the UAVs and assemble the array antenna. The off-the-ground array antenna can be used in radar systems to scan a certain ROI, and/or detect objects, within its line-of-sight. For example, in some embodiments the off-the-ground antenna array can be positioned at about 1000 to 2000 meters above the ground surface for achieving a broad and extended line-of-sight. A detection range of about 140 to 200 Km is expected for radar systems employing radar system embodiments disclosed herein.

Optionally, but in some embodiments preferably, the off-the-ground array antenna is used as a receive antenna configured to receive electromagnetic signals returning from a ROI and/or objects within its line-of-sight. One or more transmitting antennas, and their respective transmitters, can be positioned with respect to the off-the-ground array antenna, for transmitting signals towards the ROI and/or the objects. The one or more transmitting antennas can be positioned on ground mounted structure(s) (e.g., on towers/poles), and/or on UAV(s) that are not part of the formation of the off-the-ground array antenna.

The transmit antenna(s) used in some embodiments is a wideband wide-angle (e.g., azimuth of about 100°-150°, optionally about 120°) antenna (e.g., a type of hemispherical, omni-directional, or sector, antennas).

For an overview of several example features, process stages, and principles of the invention, the examples of the off-the-ground array antenna illustrated schematically and diagrammatically in the figures are intended for a radar system. These radar systems are shown as one example implementation that demonstrates a number of features, processes, and principles used for scanning a ROI and/or detecting objects within the line-of-sight of the array antenna, but they are also useful for other applications and can be made in different variations. Therefore, this description will proceed with reference to the shown examples, but with the understanding that the invention recited in the claims below can also be implemented in myriad other ways, once the principles are understood from the descriptions, explanations, and drawings herein. All such variations, as well as any other modifications apparent to one of ordinary skill in the art and useful in antenna systems applications may be suitably employed, and are intended to fall within the scope of this disclosure.

FIG. 1A schematically illustrates an off-the-ground array antenna 12 assembled by a formation/array of UAVs 11. In this specific and non-limiting example the formation of UAVs 11 is assembled by four drones, 11a, 11b, 11c and 11d, positioned at a defined location above the ground 19. Each drone 11 carries at least one antenna element mounted thereon such that the antenna elements become aligned when the drones 11 are is a defined formation, to thereby form the array antenna structure 12. In this specific and non-limiting example each drone carries an array of four antenna elements, 12a, 12b, 12c, 12d, attached to a support in a spaced apart and aligned fashion. In some possible embodiments the array of antenna elements carried by each drone 11 can be a two-dimensional array. In addition, while FIG. 1 shows a formation in which the UAVs 11 are arranged one next to the other along an imaginary line 11e forming a one-dimensional/linear antenna array, in other possible embodiments the UAVs can be configured to create two-dimensional formation/array, including two or more rows of UAVs and two or more columns of UAVs, and thereby form a two-dimensional array antenna structure (e.g., as demonstrated in FIG. 2B).

In this specific and non-limiting example the array antenna 12 is used as a receiving antenna system of a radar system 10, configured to receive return/reflection signals 18w from the ROI 19 and/or the object 18. The radar system 10 comprises a ground control station 15 configured to communicate data and instructions with the UAVs 11, and transmit electromagnetic signals towards a ROI (e.g., terrain 19) and/or object 18, within the line-of-sight of the array antenna 12. The control station 15 comprises a transceiver 15x, data communication interface (CIF) 15f, and one or more antennas Ax coupled thereto for communicating data and/or instructions with the UAVs 11 in signals 11w. The control station 15 can have a control unit 15c comprising one or more processors 15p and memories 15m, configured for determining a formation and respective locations for the UAVs 11, and transmit the determined formation and location data to the UAVs 11 over the communication link 11w.

The control unit 15c can be configured to instruct the UAVs 11 to positon the array antenna 12 in a new off-the-ground location, to change distances between neighboring UAVs 11 to thereby set a new aperture of the antenna array 12, to change orientation of the formation/array of UAVs 11 to thereby change a broad side of the antenna array 12, and/or to change the shape of the formation/array of UAVs 11 to thereby set a new shape of the antenna array 12 e.g., change dimension of the array, for example to change from a 3×4 array into a 2×6 array, or into a 1×12 array.

In this specific and non-limiting example the control station 15 comprises one or more transmitting antennas At, and respective transmitter unit 14x coupled thereto, for transmitting signals 14w towards the ROI (e.g., terrain 19) and/or the object 18 within the line-of-sight of the off-the-ground receive array antenna 12. For example, and without being limiting, the transmitting antenna(s) At can be mounted on a tower or pole, or any suitable elevated structure/position.

Each UAV 11 comprises a management unit 17 configured to control engine(s) (not shown) of the UAV to set its position and/or its orientation and maintain the UAV in its position in the formation/array 11y, receive the return signals 18w reflected from the object(s) 18 and/or the ROI 19, and transmit data indicative of the received the return signals 18w to the control station 15 over the communication channel 11w. The control unit 15c of the control station 15 can be configured to process the data indicative of the return signals 18w received from the UAVs 11 over the communication channel 11w, and determine based thereon the locations of one or more objects 18, and/or features of the terrain of the ROI 19.

FIG. 1B is a block diagram of a management unit 17 of a UAV 11 according to some possible embodiments. The management unit 17 comprises in this non-limiting example communication antenna elements An, transceiver 17m, and communication interface (CIF) 17f, for communication data/instructions with the control station 15 over the communication channel 11w. One or more imagers/cameras 17r can be used in the management unit 17 to image neighboring UAVs 11 in the formation/array 11y, and for determining distances of the UAV 11 from the neighboring UAVs 11 in the formation/array 11y. A control unit 17c, comprising one or more processors 17p and memories 17e, provided in the management unit 17 can be used to determine the distances of the UAV 11 from the neighboring UAVs 11 based on the imagery data obtained from the one or more imagers/cameras 17r. The control unit 17c can be configured to generate flight control data based on the determined distances of the UAV 11 from the neighboring UAVs 11, for correcting the position of the UAV 11 in the formation/array 11y, if so needed.

The management unit 17 may comprise a GPS unit 17g configured to determine the geographical location of the UAV 11. This way the control station 15 can provide each UAV 11 its location in the formation 11y over the communication channel 11w, and the control unit 17c can then control the engines and/or wings (or other steering means) of the UAV 11 to bring it into its position based of the location data obtained from the GPS unit 17g. Thereafter, control unit 17c can use the imagers/cameras 17r for accurately placing the UAV 11 in the formation/array of UAVs 11y. Additionally, or alternatively, the control unit 17c is configured to position the UAV 11 in the formation/array of UAVs and antenna its position the formation/array, using local positioning system (LPS) techniques.

In some possible embodiments at least one UAV 11, or all of the UAVs 11, configured to use the antenna element(s) An and transceiver 17m for communicating signals/data with the other UAVs 11 in the formation/array 11y. For example, and without being limiting, one or more of the UAVs 11 can be implemented without the imagers/cameras 17r and configured to get into their position in the array/formation 11y based on instructions/data received from one or more of the UAVs 11 having the imagers/cameras 17r. Alternatively, or additionally, one or more of the UAVs 11 having imagers/cameras 17r can be configured to get into position in the formation/array 11y utilizing LPS techniques, and then use imagery data from the imagers/cameras 17r to generate instructions/data for transmission to one or more of the other UAVs 11 for directing and/or maintaining then in position in the formation/array. The UAV management unit 17 comprises in some embodiments an accurate clock unit, such as an atomic clock, that can be used for synchronizing the return/reflection signals received by its antenna element(s) (12) with the return/reflection signals received by antenna element(s) (12) of the other UAVs 11. The battery 17b, or any other power source used for powering UAV's engine(s), can be mounted in any suitable part of the UAV 11, not necessarily in the UAV management unit 17.

The engine(s) (not shown) of the UAV 11 can be implemented by a type of electric and/or combustion engine(s), which may be also used to operate an electric power generator (not shown) for powering the various different components of the management unit 17 and/or for charging the battery 17b. In case combustion engine(s) is used, the battery 17b is still needed in some embodiments for guaranteeing continuous operation of the various components of the management unit 17, and for safely landing the UAV 11 in a defined/safe region by an electric engine thereof, in case of malfunction and/or combustion engine(s) failure.

Optionally, the antenna elements in some, or all, of the UAVs 11 are also used to transmit electromagnetic signals towards the ROI 19 and/or object 18. Accordingly, in some possible embodiments the UAV management unit 17 comprises a transmitter (not show), for transmitting the electromagnetic signals towards the ROI 19 and/or object 18 via the antenna elements (12).

It is noted that the UAVs 11 in system 10 can be implemented by other types of flying objects, and not necessarily by drones. In addition, the transmit antenna(s) At of the radar system 10 is not necessarily mounted on a ground structure, as demonstrated in FIG. 1A, and it may be similarly mounted on one or more UAVs, which are not part of the UAVs formation/array 11y.

FIG. 2A schematically illustrates a radar system 20 according to some possible embodiments, wherein the transmitting antenna(s) At are mounted on one or more UAVs 14 (also referred to herein as Tx-UAVs). Optionally, the Tx- UAVs 14 also comprise respective transmitter(s) for transmitting the electromagnetic signals via the transmitting antenna(s) At, and data communication components for communicating data/instructions with the ground control 25. In some embodiments, the Tx-UAVs 14 are connected to an electric cable 14e configured to communicate data/instructions and/or transmission signals with a ground station 14h. Engine(s) (not shown) of the Tx-UAVs 14 can be implemented by a type of electrical and/or of a combustion engine. If electrical engines are used, the electrical cable 14e may comprise power supply wires for supplying electrical power from the ground station 14h to the Tx-UAVs 14. Optionally, but in some embodiment preferably, the ground station 14h is mounted on a land vehicle.

In the specific and non-limiting example of FIG. 2A the UAVs 11 carrying the receiving antenna elements 12 are implemented by drone balloons 22 configured to create a two dimensional formation (array) 21y. This way, by maintaining the UAVs 11 in their accurate locations in the formation 21y, the antenna element(s) carried by each UAV 11 can be accurately aligned to from a defined two dimensional antenna array structure for receiving the signals 18w returned/reflected back from the object 18 and/or the ROI 19. It is however noted that any other suitable UAV\flying object 11, can be used to similarly create the two dimensional formation (array) 21y. Also, though the Tx-UAV 14 carrying the transmit antenna(s) At is implemented in this non-limiting example by a drone, it can be similarly implemented by any other suitable type of UAV (e.g., drone balloon or helicopter).

The control center 25 in this non-limiting example can thus include the communication antenna(s) Ax, transceiver 15x, and communication interface (CIF) 15f, for communicating data/instructions with the Rx-AUVs 11 over the communication link 11w, and the control unit 15c comprising one or more processors 15p and memories 15m for managing the transmission of the electromagnetic signals 14w by the Tx-UAV(s) 14, and processing data indicative of the return/reflection signals 18w received from the antenna array 12 carried by the formation/array of UAVs 11. Accordingly, the control center 25 can be configured to communicate via its transceiver 15x and one or more antennas Ax, data/instructions with the ground station 14h and/or the Tx-UAV(s) 14, for managing the transmission of the electromagnetic signals 14w.

The Tx-UAV 14 comprises a Tx-UAV management unit 24 configured to control engine(s) (not shown) of the Tx-UAV 14 and/or wings/steering means, to set location and/or orientation of the Tx-UAV 14, and to operate the transmission of the electromagnetic signals 14w. FIG. 2B shows components of a Tx-UAV management unit 24 according to some possible embodiments. In this specific and non-limiting example the Tx-UAV management unit 24 comprises a control unit 24c, having one or more processors 24p and memories 24e, configured to operate the engine(s) (not shown) of the Tx-UAV 14 and/or wing/steering means, for setting location and/or orientation of the Tx-UAV 14, and a communication interface (CIF) 24f configured to handle communication of data/instructions with the ground station 14h over the electric cable 14e.

In some embodiments the transmission signals are generated by the ground station 14h and transmitted to the Tx-UAV 14 for transmission over the electric cable 14e. A high power amplifier unit (HPA) 24a can be thus used in the Tx-UAV management unit 24 for amplifying the transmission pulse signals received from the ground station 14h over the electric cable 14e. The Tx-UAV management unit 24 comprises in some embodiments an accurate clock device 24k, such as an atomic clock, used by the control unit 24c to synchronize the transmission of the electromagnetic pulse signals with the return/reflection signals received by the array antenna 12. Optionally, but in some embodiments preferably, a parachute 24u is also provided in the Tx-UAV 14 for safely landing the Tx-UAV 14 in case of malfunction and/or engine(s) failure. The parachute 24u can be placed in any suitable part of the Tx-UAV 14, and it is not required to be part of the Tx-UAV management unit 24.

Optionally, the Tx-UAV 14 is also configured to receive electromagnetic signals returned/reflected form the ROI 19 and/or object 18. Accordingly, in some possible embodiments, the Tx-UAV 14 comprises one or more receivers, and one or more respective analog-to-digital (A/D) converters, configured to receive and digitize the returned/reflected electromagnetic signals.

Figure 3:
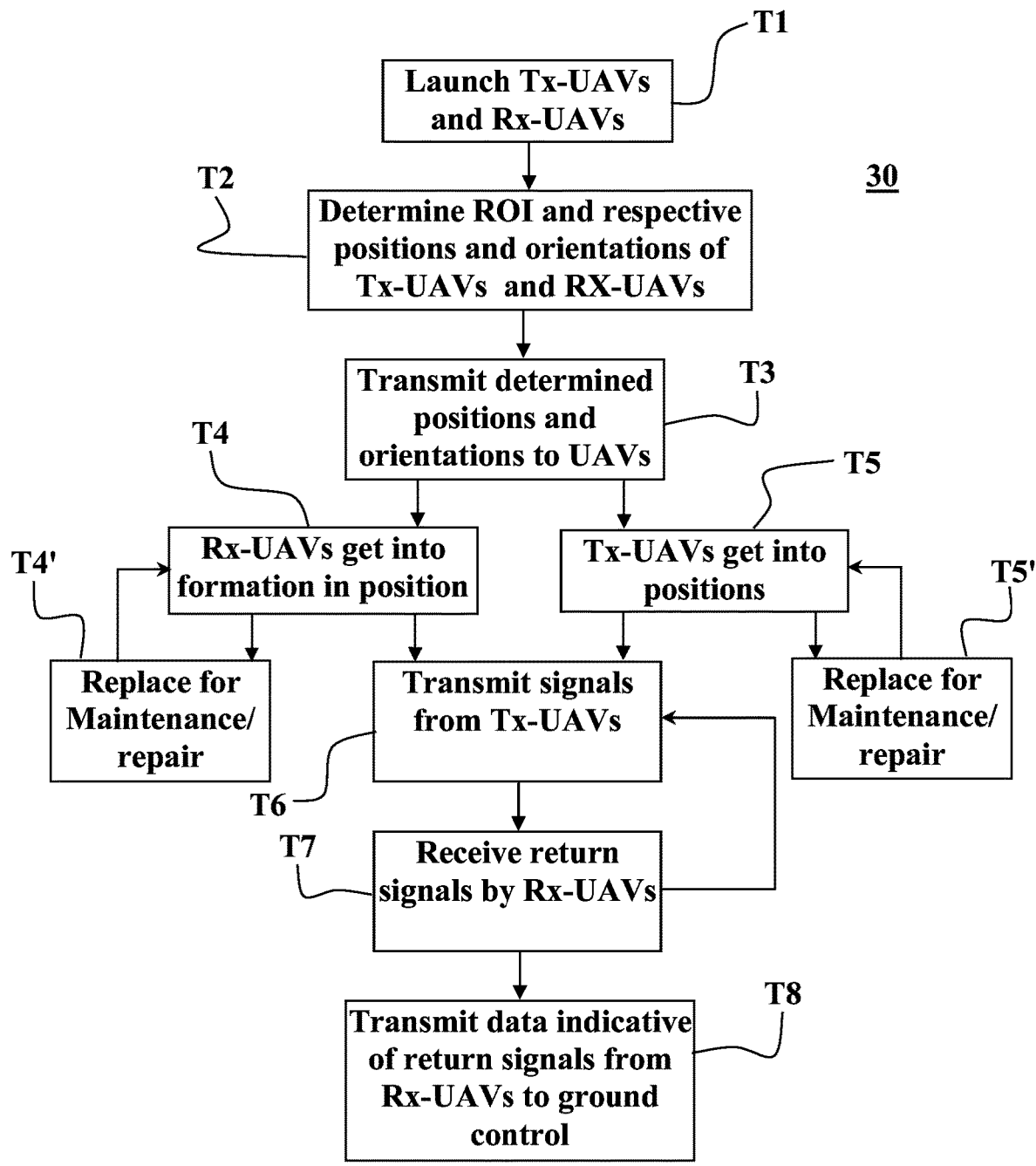
FIG. 3 is a flowchart schematically illustrating deployment and operation of off-the-ground array antenna according to some possible embodiments.

FIG. 3 is a flowchart 30 demonstrating a process utilizing the off-the-ground array antenna according to some possible embodiments. The process starts in step T1 in which the Tx-UAVs (14) and the Rx-UAVs (11) are launched from a setup location. In step T2 the ROI to be scanned/monitored is determined, and based on the determined ROI respective positions and orientations of the Tx-UAVs (14) are determined for scanning the ROI, and respective positions and orientations of the Rx-UAVs (11) are determined for assembling a desired array antenna structure operable to receive electromagnetic signals return/reflected from the ROI. In step T3 the determined positions and orientations are transmitted to the UAVs, and in step T4 the Rx-UAVs (11) are moved to their target positions and set into their desired orientations to construct the desired array antenna structure, and in step T5 the Tx-UAVs (14) are moved to their target positions and set into their desired orientations. Step T4 comprises correcting movements of the Rx-UAVs (11) applied based on the imagery data obtained from the imagers/cameras (17r) of the Rx-UAVs, and/or based on location data determined from the LPS, as may be required for placing and maintaining each Rx-UAV (11) in its position in the determined formation/array of UAVs.

After placing the Tx-UAVs (14) and the Rx-UAVs (11) in their determined positions and orientations, in step T6 electromagnetic signals are transmitted via the transmit antennas of the Tx-UAVs (14) towards the determined ROI, and in step T7 corresponding return signals reflected from the ROI (19), and/or from the object (18) located therewithin, are received by the antenna array formed by the Rx-UAVs (11). Step T7 can include converting the return signals received by the antenna elements of the Rx-UAVs (11) into corresponding digital signals. In step T8 the Rx-UAVs (11) transmit to the ground control (25/15) data indicative of the return signals received in their antenna elements. Step T8 can be carried after step T7 is performed, or periodically, or intermittently, after several cycles of transmittal of the electromagnetic signals in step T6, and receipt of their corresponding return signals in step T7, are performed.

Figure 4:
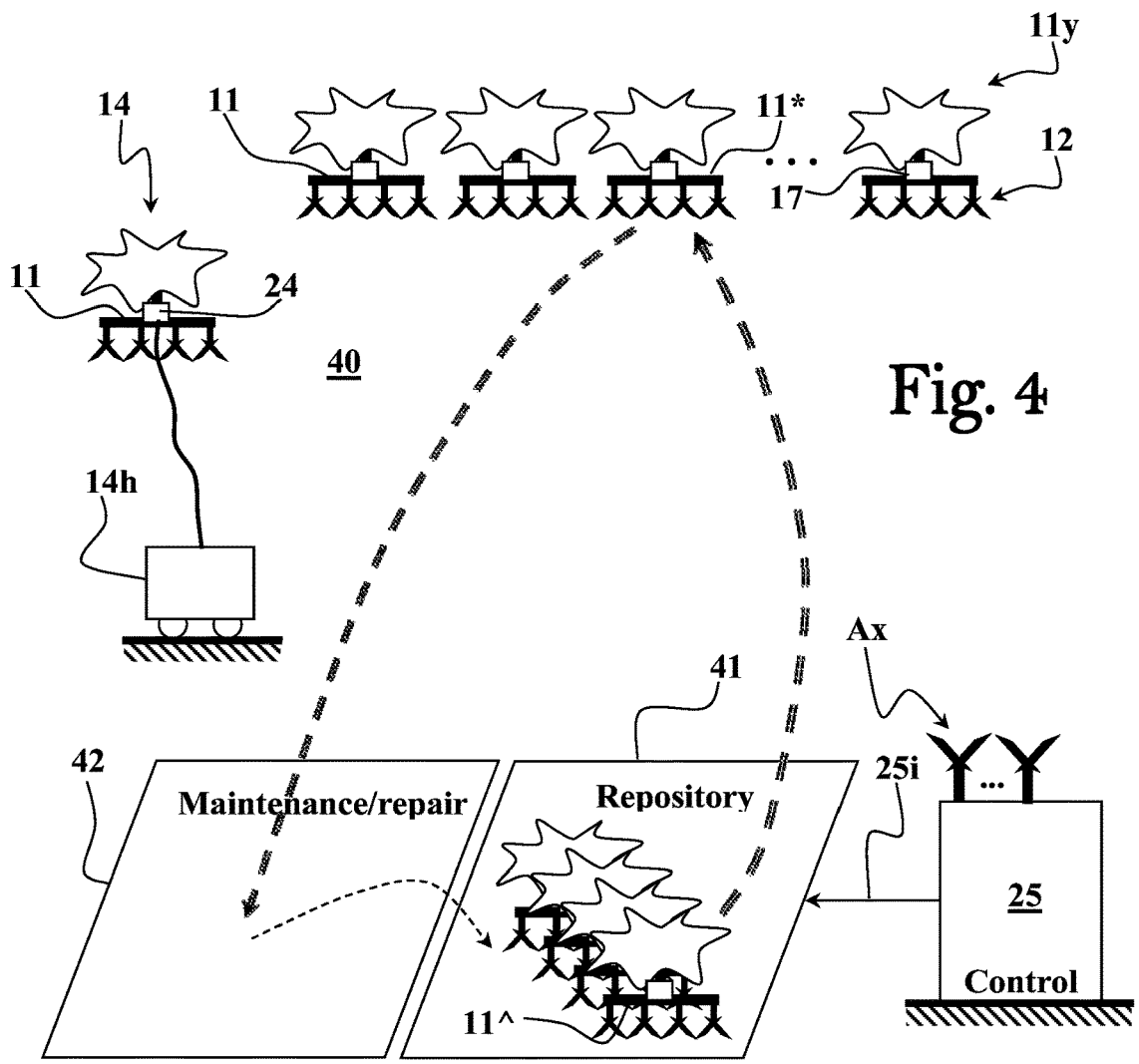
FIG. 4 schematically illustrates operational procedures that can be carried during operation of the antenna system according to some possible embodiments.

If a problem, such as, a malfunction, engine failure, and/or exhaustion of power supply (e.g., buttery and/or fuel depletion), is identified in one or more of the Rx-UAVs (11) during operation, in step T4' the Rx-UAVs (11) in which such problem is identified are replaced by fresh Rx-UAVs (11) from a repository (shown in FIG. 4). Similarly, if such problem is identified in one of the Tx-UAVs (14), in step T5' it is replaced by a fresh Tx-UAVs (14) from the repository. The system can comprise a repository and launch facility 41 of fresh and ready for operation AUVs 11, and maintenance/ repair facility 42, configured for supporting system operation and ensuring continuous and uninterrupted operation as much as possible, as described below.

FIG. 4 schematically illustrates replacement of a UAV 11 during operation for maintenance and/or repair. The system 40 in this specific and non-limiting example comprises one Tx-UAV 14 operatively positioned above the ground surface for transmitting electromagnetic signals towards a ROI/object(s), and an array of Rx-UAVs 11 operatively aligned above the ground surface in a row (linear) formation, thereby aligning the antenna element(s) carried by each Rx-UAV 11 to form an array antenna 12. In a similar manner, the Rx-UAVs 11 can be arranged above the ground to form a two-dimensional array for assembling a two-dimensional array antenna structure.

During operation the ground control 25 can identify malfunctions and/or power depletion, and/or other failures, in one or more of the Rx-UAVs 11*, and consequently decide to replace the problematic Rx-UAVs 11* (also referred to as retiring UAV). When such problems are identified, the ground control 25 issues instruction 25i, transmitted to the repository 41 over communication wires, and/or wirelessly, to launch fresh Rx-UAVs 11^ towards the formation/array 11y, for replacing the problematic Rx-UAVs 11*. This replacement can be carried out very quickly with minimal interruption to the operation of the array antenna of system 40. Once replaced by the fresh Rx-UAVs 11^, the problematic Rx-UAVs 11* are flown to the maintenance/repair 42 for conducting maintenance, and/or refueling/charging, and/or repair procedures and restoring them back to their operational and functional state. The UAVs can be then transferred from the maintenance/repair 42 to the repository 41 for any further AUVs replacement, if so needed.

Figure 5:
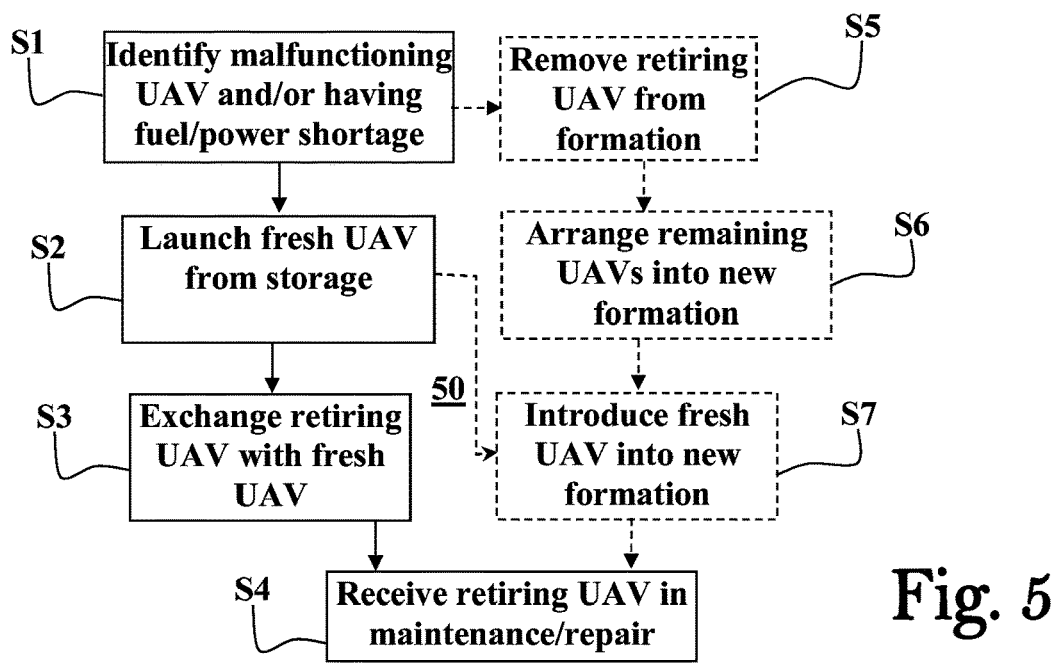
FIG. 5 is a flowchart schematically illustrating a process of replacing a UAV from the UAV formation with a fresh UAV from storage, according to some possible embodiments.

FIG. 5 is a flowchart schematically illustrating AUV replacement process according to some possible embodiments. The process 50 starts in step S1 when a problematic UAV, which can be either a Tx-UAV or a Rx-UAV, is identified by the system. In step S2 a suitable fresh UAV is launched from the repository (41) towards the problematic UAV to be replaced, in step S3 the problematic UAV is exchanged by the fresh UAV, and in step S4 the problematic UAV is received for maintenance and/or repair.

Optionally, and in some embodiments preferably, whenever a problematic Rx-UAV is identified in step S1, during the launching of the fresh UAV from the repository (41) in step S2, or shortly before or after, the problematic Rx-UAV is removed from the formation in step S5, and in step S6 the remaining Rx-UAVs are rearranged to create a new formation/array structure without the retiring Rx-UAV, thereby constructing a new array antenna structure with the antenna elements of the remaining Rx-UAVs, in order to minimize as much as possible interruption in the system operation. In step S7 the fresh Rx-UAV reaches the formation and introduced thereinto to restore the original formation, and thereby restore the original array antenna structure. In step S4 the problematic Rx-UAV is landed and moved to the maintenance/repair component.

It should also be understood that throughout this disclosure, where a process or method is shown or described, the steps of the method may be performed in any order or simultaneously, unless it is clear from the context that one step depends on another being performed first.

Optionally, and in some embodiments preferably, the communication between the Rx-UAV, the Tx-UAV, and the ground/central control units is carried using 5G communication (fifth generation cellular mobile communications).

Functions of the system described hereinabove may be controlled through instructions executed by a computer-based control system which may be part of the control unit(s). A control system suitable for use with embodiments described hereinabove may include, for example, one or more processors connected to a communication bus, one or more volatile memories (e.g., random access memory—RAM) or non-volatile memories (e.g., Flash memory). A secondary memory (e.g., a hard disk drive, a removable storage drive, and/or removable memory chip such as an EPROM, PROM or Flash memory) may be used for storing data, computer programs or other instructions, to be loaded into the computer system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

For example, computer programs (e.g., computer control logic) may be loaded from the secondary memory into a main memory for execution by one or more processors of the control system/unit. Alternatively or additionally, computer programs may be received via a communication interface. Such computer programs, when executed, enable the computer system to perform certain features of the present invention as discussed herein. In particular, the computer programs, when executed, enable a control processor to perform and/or cause the performance of features of the present invention. Accordingly, such computer programs may implement controllers of the computer system. The processor generally serves to execute software instructions that may be loaded into a memory. The processor may be a number of processors, a multi-processor core, or some other type of processor, depending on the particular implementation. The processor may be implemented using a number of heterogeneous processor systems in which a main processor is present along with secondary processors on a single chip. As another illustrative example, the processor may be a symmetric multi-processor system containing multiple processors of the same type.

Communications unit/interface, in these examples, provides for communications with other data processing systems or devices. In these examples, communications unit/interfaces can be implemented by a network interface card. Communications unit/interfaces may provide communications through the use of physical and/or wireless communications links.

In an embodiment where the invention is implemented using software, the software can be stored in a computer program product and loaded into the computer system using the removable storage drive, the memory chips or the communications interface. The control logic (software), when executed by a control processor, causes the control processor to perform certain functions of the invention as described herein.

In another embodiment, features of the invention are implemented primarily in hardware using, for example, hardware components such as application specific integrated circuits (ASICs) or field-programmable gated arrays (FPGAs). Implementation of the hardware state machine so as to perform the functions described herein will be apparent to persons skilled in the relevant art(s). In yet another embodiment, features of the invention can be implemented using a combination of both hardware and software.

As described hereinabove and shown in the associated figures, the present invention provides a maneuverable and scalable/adaptive array antenna system usable for radar systems, and related methods. While particular embodiments of the invention have been described, it will be understood, however, that the invention is not limited thereto, since modifications may be made by those skilled in the art, particularly in light of the foregoing teachings. As will be appreciated by the skilled person, the invention can be carried out in a great variety of ways, employing more than one technique from those described above, all without exceeding the scope of the claims.

The invention claimed is:

1. An array antenna configured to be placed at a determined position above a ground surface, said array antenna comprising:
a plurality of unmanned aerial vehicles (UAVs) assembled together, each of said plurality of UAVs carrying one or more antenna elements of said array antenna a control unit configured and operable to control movement of said UAV for accurately maintaining the UAV in position within a selected formation of the plurality of UAVs above the ground surface, and at least one imager/camera configured to acquire imagery data of other UAVs of the plurality of UAVs in the formation,
said plurality of UAVs configured to create a defined formation at said determined position above the ground and thereby align the one or more antenna elements carried by the plurality of UAVs to form said array antenna,
said array antenna configured to receive electromagnetic signals reflected from a region of interest, or from one or more objects, within a line of sight thereof;
wherein the control unit is configured to process said imagery data, determine distances of said UAV from at least one of said other UAVs, and whenever needed, apply correcting movements to said UAV for maintaining said UAV in an accurate position thereof in the formation of UAVs.

2. The array antenna of claim 1 wherein each of the plurality of UAVs comprises at least one receiver configured to receive the electromagnetic signals from the one or more antenna elements.

3. The array antenna of claim 1 wherein a distance between neighboring antenna elements in said array antenna is determined according to a frequency of the electromagnetic signals.

4. The array antenna of claim 1 wherein each of the plurality of UAVs comprises one or more analog-to-digital converters configured to convert the electromagnetic signals received by the one or more antenna elements of the UAV into corresponding digital signals.

5. The array antenna of claim 1 wherein each of the plurality of UAVs comprises a data communication unit configured to communicate data with a control center, said data comprising data indicative of the electromagnetic signals received by the one or more antenna elements of said UAV.

6. The array antenna of claim 1 wherein each of the plurality of UAVs comprises an accurate clock device for synchronizing between the electromagnetic signals received by the one or more antenna elements of the different UAVs in the formation.

7. The array antenna of claim 1 wherein at least one of the plurality of UAVs comprises a global positioning system (GPS) unit configured to generate location data indicative of a location of said UAV, and wherein the control unit is configured to receive position data indicative a target location of said UAV in space, and control movement of said UAV for placing said UAV at said target location based on the location data received from the GPS unit.

8. The array antenna of claim 1 wherein the control unit is configured to receive data indicative of a position in which the UAV needs to be in the formation, and if needed, apply correcting movements to said UAV based on the imagery data from the one or more imagers/cameras for accurately placing the UAV in its position in the formation.

9. The array antenna of claim 1 wherein the control unit is configured to use local positioning systems to position and maintain the UAV in a location thereof in the formation.

10. The array antenna of claim 1 wherein at last one of the plurality of UAVs comprises combustion engine(s).

11. A radar system utilizing the array antenna of claim 1 as a receiving antenna, said radar system comprising one or more transmitting antennas mounted on land and/or aerial structures for transmitting electromagnetic signals towards one or more objects and/or a region-of-interest (ROI) within the line of sight of the array antenna.

12. The radar system of claim 11 wherein the one more transmitting antennas are mounted on respective one or more transmitting UAVs (Tx-UAVs), said Tx-UAVs are not part of the UAV formation creating the receive array antenna of the system.

13. The radar system of claim 12 wherein each of the one or more Tx-UAVs is connected by an electrical cable to a ground station, said electric cable configured to communicate signals/data and/or instructions between said Tx-UAV and said ground station.

14. The radar system of claim 13 wherein the Tx-UAV is operated by electrical engine(s), and wherein said electric cable is configured to provide electrical power to said electrical engine(s).

15. The radar system of claim 12 wherein the Tx-UAV is operated by combustion engine(s).

16. The radar system of claim 11, further comprising a control center configured to transmit to the UAVs data indicative of a location at which at least one of said plurality of UAVs is to be positioned.

17. The radar system of claim 16 wherein the control center configured to transmit to the plurality of UAVs data indicative of at least one of the following: at least one required geometrical dimension of the array antenna; a required aperture of the array antenna; a required orientation of at least one of the plurality of UAVs; a required broadside of the array antenna; or a required new position of the array antenna, and wherein the control units of the plurality of UAVs are configured to adjust locations of one or more of the plurality of UAVs accordingly.

18. A method of constructing an array antenna, the method comprising:
launching a plurality of unmanned aerial vehicles (UAVs), each of said plurality of UAVs comprising at least one antenna element and receiver configured to receive electromagnetic signals reflected from a region-of-interest (ROI) and/or at least one object;
determining location and at least one geometrical dimension of said array antenna and transmitting to each UAV respective position data to arrange said plurality of UAVs in a formation to thereby construct said array antenna having the at least one geometrical dimension at the determined location; and using at least one of the plurality of UAVs to acquire imagery data of at least another one of said plurality of UAVs, processing said imagery data to determine a distance of said at least another one of the plurality of UAVs, and controlling one or more of the plurality of UAVs to adjust locations thereof based on the determined distance.

19. The method of claim 18, further comprising transmitting to the plurality of UAVs data indicative of at least one of the following: a required aperture of the array antenna; a required orientation of at least one of the plurality of UAVs; a required broadside of the array antenna; or a required new position of the array antenna, and controlling one or more of the plurality of UAVs to adjust their locations and/or orientations accordingly.

20. The method of claim 18, further comprising using a global positioning system to determine location of at least one of the plurality of UAVs, and controlling one or more of the plurality of UAVs to adjust locations thereof based on the determined location.

21. The method of claim 18, further comprising using a local positioning system to determine location of at least one of the plurality of UAVs, and controlling one or more of the plurality of UAVs to adjust locations thereof based on the determined location.

22. The method of claim 18, further comprising transmitting by each of the plurality of UAVs data indicative of the electromagnetic signals received by at least one antenna element thereof to a control center.

23. The method of claim 18, further comprising accurately determining a time of arrival of the electromagnetic signal received in the at least one antenna element of each one of said plurality of UAVs.

24. The method of claim 18, further comprising identifying at least one malfunctioning or energy depleted UAV in the plurality of UAVs, launching respective at least one new UAV towards the plurality of UAVs formation for replacing said at least one malfunctioning or energy depleted UAV.

25. The method of claim 24, further comprising removing the at least one malfunctioning or energy depleted UAV from the UAVs formation, and controlling one or more of the plurality of UAVs to adjust locations thereof to construct a new formation of the remaining UAVs of the plurality of UAVs, to thereby construct a new array antenna structure.

26. The method of claim 25, further comprising introducing the respective at least one new UAV into the new formation to thereby restore an original formation of the UAVs, or construct a new modified new array antenna structure.

27. The method of claim 18, further comprising controlling one or more of the plurality of UAVs to adjust locations thereof to thereby adjust at least one geometrical dimension of the array antenna to comply to a frequency of the electromagnetic signals.

28. The method of claim 18, further comprising transmitting by one or more transmitters and respective antenna elements electromagnetic signal towards the ROI and/or at least one object.

29. The method of claim 28 wherein each of the one or more transmitters and respective antenna elements is mounted on a transmitting UAV (Tx-UAV), the method further comprising launching said one or more Tx-UAVs, transmitting to each of said one or more Tx-UAVs data indicative of a required position of said Tx-UAV and direction of transmittal thereof, and controlling one or more of the Tx-UAVs to adjust their locations and/or orientations accordingly.

30. The method of claim 29, further comprising transmitting to at least one of the Tx-UAVs data indicative of at least one of a required orientation of said at least one Tx-UAV and a required position of said at least one Tx-UAV, and controlling said at least one Tx-UAV to adjust its location and/or orientation accordingly.

31. A control system of an array antenna, said control system comprising:

a control unit; and one or more transceivers and antennas configured to communicate data with at a plurality of unmanned aerial vehicles (UAVs), each of said plurality of UAVs comprising at least one antenna element and receiver configured to receive electromagnetic signals reflected from a region-of-interest (ROI) and/or one or more objects, and at least one transceiver and antenna element configured to communicate the data with said control unit, wherein said control unit is configured to receive from each of said plurality of UAVs data indicative of electromagnetic signals received by at least one antenna element thereof, and to transmit to said plurality of UAVs position data for constructing a formation and thereby form an array antenna structure by the at least one antenna element of each of said plurality of UAVs; and wherein the control unit is configured to communicate data with at least one Tx-UAV, each of said at least one Tx-UAV having one or more transmitters and antenna elements for transmitting the electromagnetic signals towards the ROI and/or the one or more objects, and at least one receiver and antenna for receiving data from said control center, said control center configured to transmit to said at least one Tx-UAV data indicative of at least one of a required orientation of said at least one Tx-UAV and a required position of said at least one Tx-UAV.

32. The control system of claim 31 wherein the control unit is configured to transmit to the plurality of UAVs data indicative of at least one of the following: at least one required geometrical dimension of the array antenna; a required aperture of the array antenna; a required orientation of at least one of the UAVs; a required broadside of the array antenna; or a required new position of the array antenna, and control motion of said UAVs to adjust locations one or more of the UAVs accordingly.

* * * * *